US008514582B2

(12) United States Patent
Blake et al.

(10) Patent No.: US 8,514,582 B2
(45) Date of Patent: Aug. 20, 2013

(54) COAX-BALUN MODULE

(75) Inventors: Kathleen E. Blake, Keller, TX (US); Christian S. Duran, Fort Worth, TX (US); John J. Napiorkowski, Irving, TX (US); Edward J. Reed, North Richland Hills, TX (US)

(73) Assignee: Corning Cable Systems LLC, Hickory, NC (US)

( * ) Notice: Subject to any disclaimer, the term of this patent is extended or adjusted under 35 U.S.C. 154(b) by 240 days.

(21) Appl. No.: 12/953,188

(22) Filed: Nov. 23, 2010

(65) Prior Publication Data

US 2011/0128708 A1     Jun. 2, 2011

Related U.S. Application Data

(60) Provisional application No. 61/265,136, filed on Nov. 30, 2009.

(51) Int. Cl.
*H05K 5/00* (2006.01)

(52) U.S. Cl.
USPC ............................ 361/752; 361/807; 361/810

(58) Field of Classification Search
USPC ................. 361/728–730, 752, 796, 800, 807, 361/810
See application file for complete search history.

(56) References Cited

U.S. PATENT DOCUMENTS

| | | | | |
|---|---|---|---|---|
| 4,636,920 | A * | 1/1987 | Cook et al. | 361/810 |
| 5,096,427 | A * | 3/1992 | Sadigh-Behzadi | 439/76.1 |
| 5,657,196 | A * | 8/1997 | Chaudhry et al. | 361/117 |
| 7,034,902 | B2 * | 4/2006 | Tajima | 348/836 |
| 7,159,053 | B1 * | 1/2007 | Lakin | 710/62 |
| 7,699,623 | B2 * | 4/2010 | Yoshida et al. | 439/76.2 |
| 2006/0225119 | A1 * | 10/2006 | Wollmershauser et al. | 725/121 |
| 2006/0239691 | A1 * | 10/2006 | Pender | 398/139 |
| 2007/0273455 | A1 * | 11/2007 | Guzzo et al. | 333/26 |
| 2007/0283406 | A1 * | 12/2007 | Blake et al. | 725/127 |
| 2011/0188650 | A1 * | 8/2011 | Singaliese et al. | 379/413.02 |

* cited by examiner

*Primary Examiner* — Hung S Bui

(57) ABSTRACT

A coax-balun module for converting from a balanced signal to an unbalanced signal includes a housing having a balun well adapted to receive a balun transformer. The module includes a printed circuit board electrically connected to a balun transformer and a threaded connector. The printed circuit board is further electrically connected to electrical conductors adapted to carry input signals. The housing is adapted to receive a potting material to seal the other components therein.

18 Claims, 5 Drawing Sheets

COAX-BALUN MODULE

RELATED APPLICATIONS

This application claims the benefit of U.S. App. No. 61/265,136, filed 30 Nov. 2009, the entire contents of which are incorporated by reference.

TECHNICAL FIELD

The present disclosure relates generally a coax-balun module, and specifically to a coax-balun module suitable for switching between twisted pair and coaxial transmission that may be adapted to install into many different housings.

BACKGROUND

Telecommunications companies (Telcos) are in the process of leveraging their existing copper plants, mostly comprised of CAT3 and twisted pair, to deploy triple play services to existing customers. Digital Subscriber Lines or DSLs are ideal for existing copper plants because of their simplicity to deploy, cost, availability, and rugged performance. DSL is a medium for transferring data over regular phone lines and can be used to connect to the Internet. However, like a cable modem, a DSL circuit is much faster than a regular phone connection, even though the wires it uses are copper like a typical phone line. More and more providers, however, are offering triple play service, that is to say the bundling of two such bandwidth-intensive services as high-speed internet access and television with a less bandwidth-demanding Plain Old Telephone Service (POTS), over a single connection. In order to provide triple play service, such higher bandwidth xDSLs as Asymmetric Digital Subscriber Line (ADSL), ADSL2+, Very High Bit Rate DSL (VDSL) and VDSL2 are generally used by Telcos. The xDSL architecture, for example, connects an xDSL modem on each end of a twisted-pair telephone line, that is, at the "central office" (or node or remote terminal) and at the premises of the subscriber (the end user or customer). High and low bandwidth may be separated, or "split", using filters or splitters at or near the end user. The term "splitter" is used to refer to a circuit or component that accomplishes this task. For example, a low pass filter or low pass and high pass filter combination separates a first signal from a combined signal in the example of a low pass filter and separates both the first and second signals from the combined signal in the example of the low pass and high pass filter combination.

The Telcos can control and monitor their existing copper plants efficiently; however, the Telcos cannot maintain or control the subscriber's copper plant after the demarcation point. This makes it difficult and expensive for the Telcos to install high speed services because of the condition of many of the subscriber copper plants after the demarcation point. Instead, the Telcos are targeting the existing coaxial infrastructure that exists in the subscriber premises.

In North America, coaxial cable, an unbalanced transmission medium, has been used a great deal since the 1970s for video transmission. A coaxial cable is a round cable where one of the conductors is a thin wire running down the middle and one conductor (usually grounded) is a cylindrical shell or braid that surrounds the first conductor. Coaxial cable has good performance through a broad frequency range, is present in a majority of American households, and can be routed passively through the subscriber premises. DSL transmission can be passively converted to coaxial cable transmission through the use of a transformer to change impedance and convert between balanced and unbalanced electrical signals. Products exist to convert between twisted pair and coaxial transmission. Such products may be too large and cumbersome for some applications, however, and may occupy from two to three positions in a standard Network Interface Device (NID).

To take advantage of the existing coaxial infrastructure, a device is needed to convert between balanced (twisted pair) and unbalanced (coaxial) electrical signals, especially a device that would occupy a single position in a NID. Additionally, an exemplary device would be suitable for use in many existing types of NIDs.

SUMMARY

A coax-balun module includes a housing, with a threaded plug mounted on an end of the housing. The threaded plug may be a coaxial connector. A balun transformer may be disposed within the housing. A printed circuit board may also be disposed within the housing. The housing may also include a balun well for housing the balun. Additionally, the housing may include a mounting projection on at least one side of the housing, the mounting projection including at least two outwardly extending flanges. The module may have a length of less than 2.2 inches, a height of less than 0.9 inch, and a width of less than 0.8 inch.

Additional features are set out in the detailed description which follows, and in part will be readily apparent to those skilled in the art from that description or recognized by practicing the described embodiments and the claims, as well as the appended drawings.

It is to be understood that both the general description and the detailed description are exemplary, and are intended to provide an overview or framework to understand the claims. The accompanying drawings are included to provide a further understanding, and are incorporated in and constitute a part of this specification. The drawings illustrate one or more embodiment(s), and together with the description serve to explain principles and operation of the embodiments.

DETAILED DESCRIPTION

Figure 1:
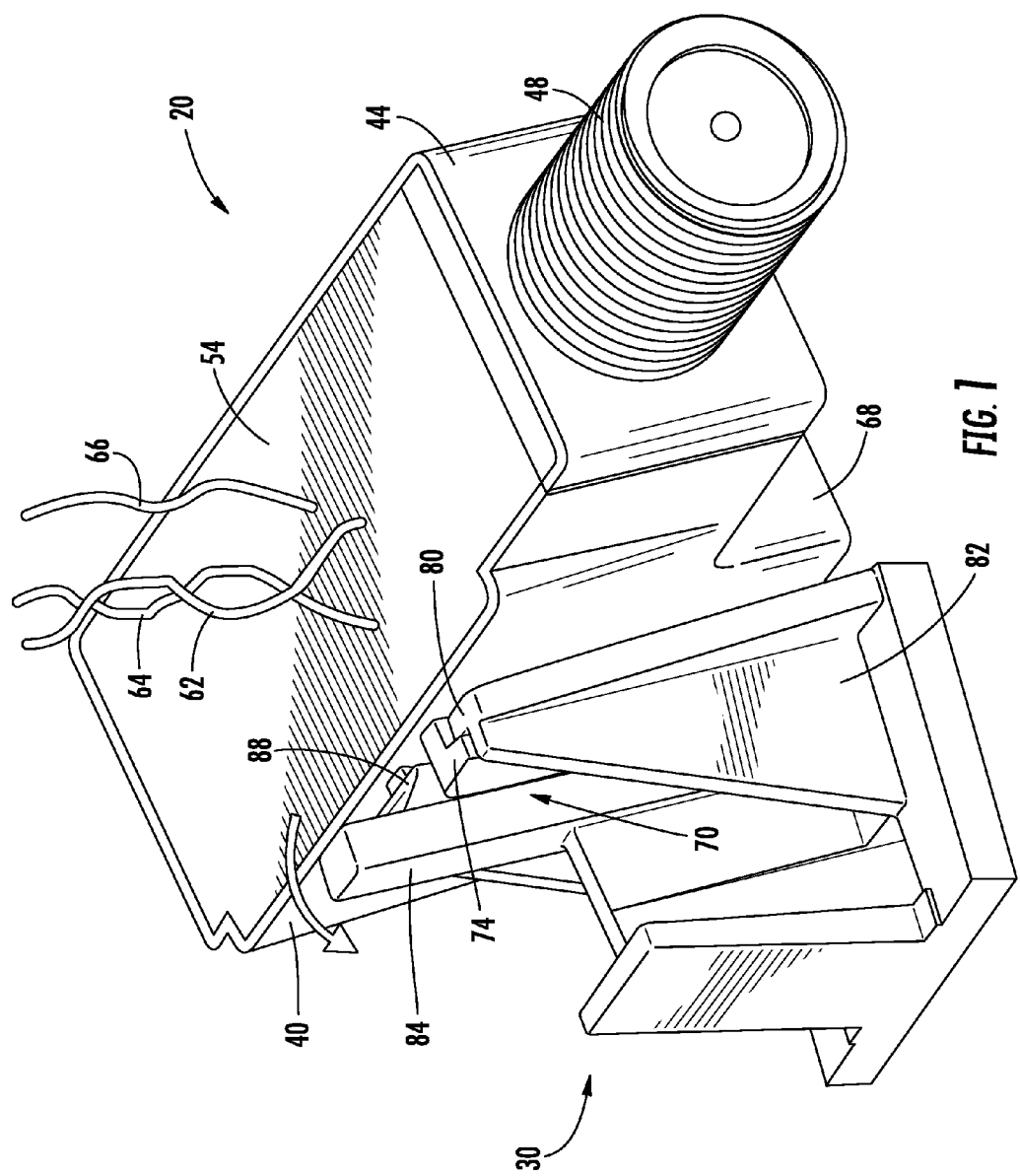
FIG. 1 is a perspective view of a coax-balun module according to one embodiment mounted on an optional splitter base.

Reference is now made in detail to exemplary embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

A coax-balun module is disclosed that includes, for example, a housing adapted to receive a balun transformer. The balun transformer may be electrically connected to, for example, a printed circuit board and a threaded connector. The threaded connector may define a coaxial connector. The printed circuit board may electrically interconnect a twisted pair of electrical conductors and a ground conductor to the threaded connector. The housing may include an opening for receiving, for example, a potting compound for sealing and insulating the conductors and printed circuit board. the housing may also include a mounting structure, for example, two outwardly extending flanges, for engaging a splitter base for installation into a standard network interface device.

Figure 2:
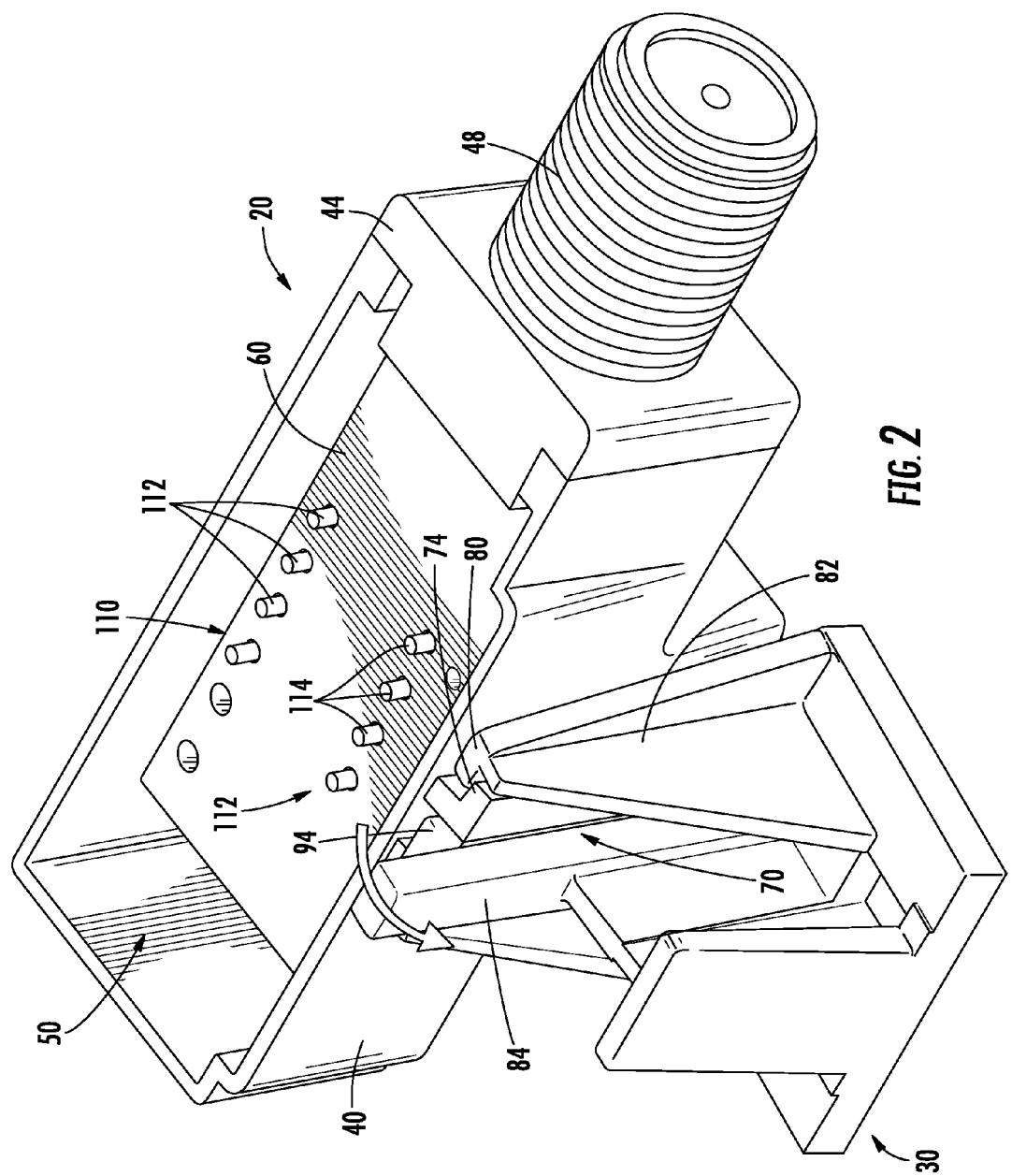
FIG. 2 illustrates the coax-balun module of FIG. 1 prior to encapsulation of the coax-balun interior and prior to connection of ground and twisted pair input signal wires.

FIG. 1 is a perspective view of a coax-balun module 20 according to one embodiment mounted on an optional splitter base 30. FIG. 2 illustrates the coax-balun module 20 prior to encapsulation of the interior of module 20 and prior to connection of ground and twisted pair input wires. A coax-balun can be generally defined as a device used to match an unbalanced coaxial transmission line or system to a balanced two-wire line or system. Module 20 may be suitable, for example, for converting DSL signals at 100 Ohms from twisted pair wire input to coaxial transmission output at 75 Ohms. According to one aspect of the present embodiment, coax-balun module 20 may be separate from a line module. Module 20 includes mounting means to allow for mounting to various devices. Module 20 may also be a relatively small, add-on module that occupies a single position in existing NIDS. Module 20 may be small enough to fit on, for example, a Universal Line Module (ULM) available from Corning Cable Systems, Hickory N.C., or used standalone or with other known modules.

Module 20 comprises a housing 40 with a front cover 44 in which a threaded plug 48 of a coaxial connection, for example, an F-connector, may be supported. Housing 40 includes, for example, generally parallelepipedal sections. Housing 40 has, for example, an open top section 50 that allows housing 40 to be filled with, for example, such a potting compound 54 as an epoxy, a silicone or a polyurethane. Open top section 50 also allows installation of and access to a printed circuit board (PCB) 60 (FIG. 2) prior to encapsulation of module 20 interior with potting compound 54. PCB 60 may be electrically coupled to a threaded plug 48 as shown with further detail in FIG. 4. A pair of input electrical conductors 62, 64, and a ground wire 66 may be also electrically coupled to PCB 60 at one or more pins 112, 114. Electrical conductors 62, 64 may provide an input signal from a DSL network that may be converted, for example, by impedance matching, to a coaxial output signal in coax-balun module 20, and vice versa. Electrical conductors 62, 64 may be, for example, ring and tip balanced signal wires connected to a DSL network. The unbalanced input for module 20 includes ground wire 66 and threaded plug 48 that may be connected to the subscriber coaxial network. The underside of housing 40 forms a balun well 68 that houses a balun (not visible in FIGS. 1 and 2). Housing 20 may be made from a polymeric material, for example, a thermoset or a thermoplastic.

Figure 3:
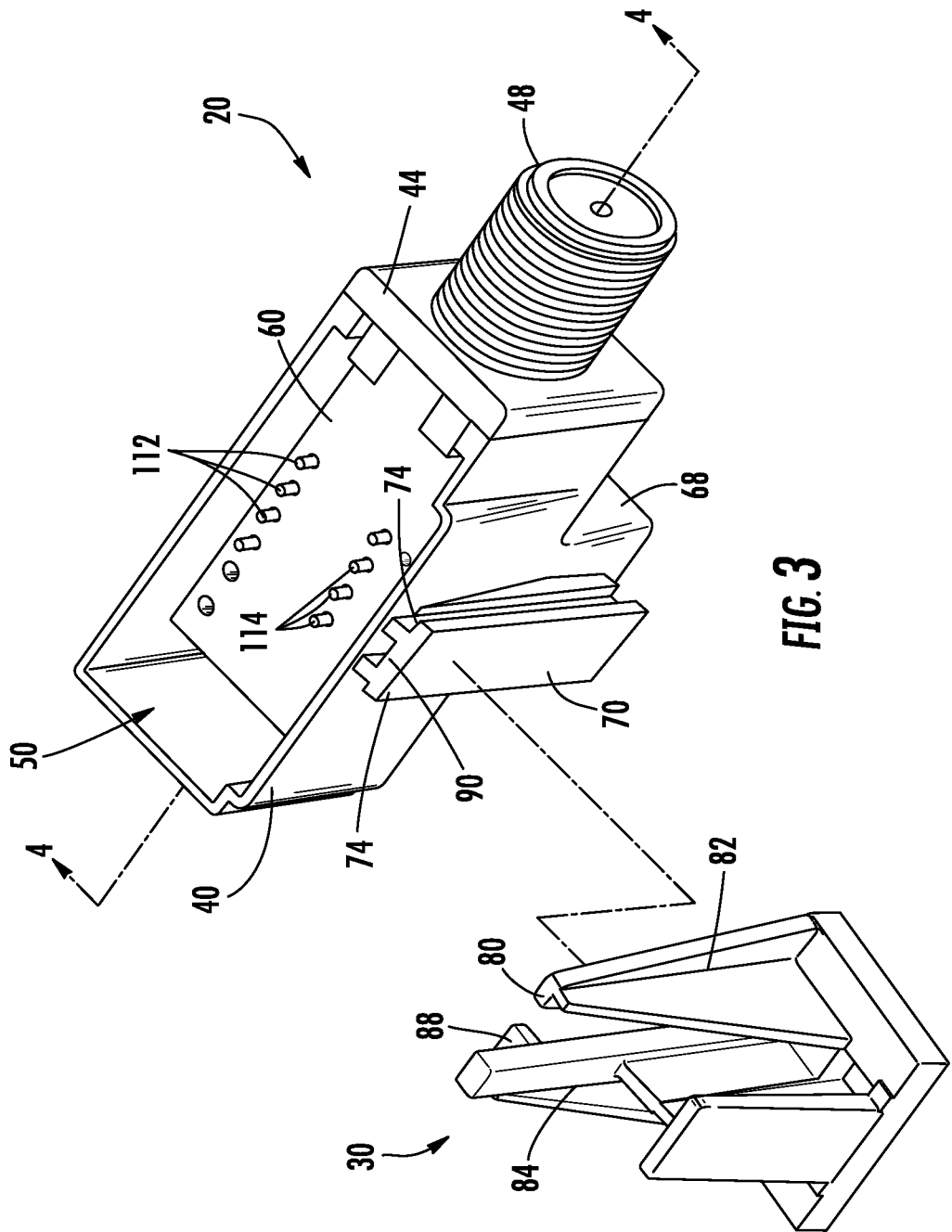
FIG. 3 illustrates the coax-balun module prior to encapsulation and prior to connection with twisted pair signal conductors and separated from the splitter base.

FIG. 3 illustrates coax-balun module 20 separated from splitter base 30 and prior to encapsulation and connection of module 20 to conductors 62, 64, 66. Referring to FIGS. 2 and 3, splitter base 30 may be an optional feature that allows module 20 to be mounted for specific applications. For example, splitter base 30 allows module 20 to be mounted on, for example, a 7600 type NID. Housing 40 engages with splitter base 30 in a mounting groove, for example, in a general sliding t-slot engagement. Housing 40 includes a mounting projection 70 having outwardly facing flanges 74 that engage with inwardly facing flanges 80 of support arms 82 of splitter base 30. Splitter base 30 may also includes a pivoting arm 84 with a snap projection 88 that engages an upper surface 90 of mounting projection 70 to secure module 20 to splitter base 30. Pivoting arm 84 may be capable of pivoting rearwardly in the direction of the curved arrow to disengage from upper surface 90 to allow coax-balun 20 to be removed from splitter base 30.

Mounting projection 70 may be a universal attachment means that allows coax-balun module 20 to be attached to a line module. Module 20 may be mounted in two orientations by rotating module 20 by 180 degrees.

Figure 4:
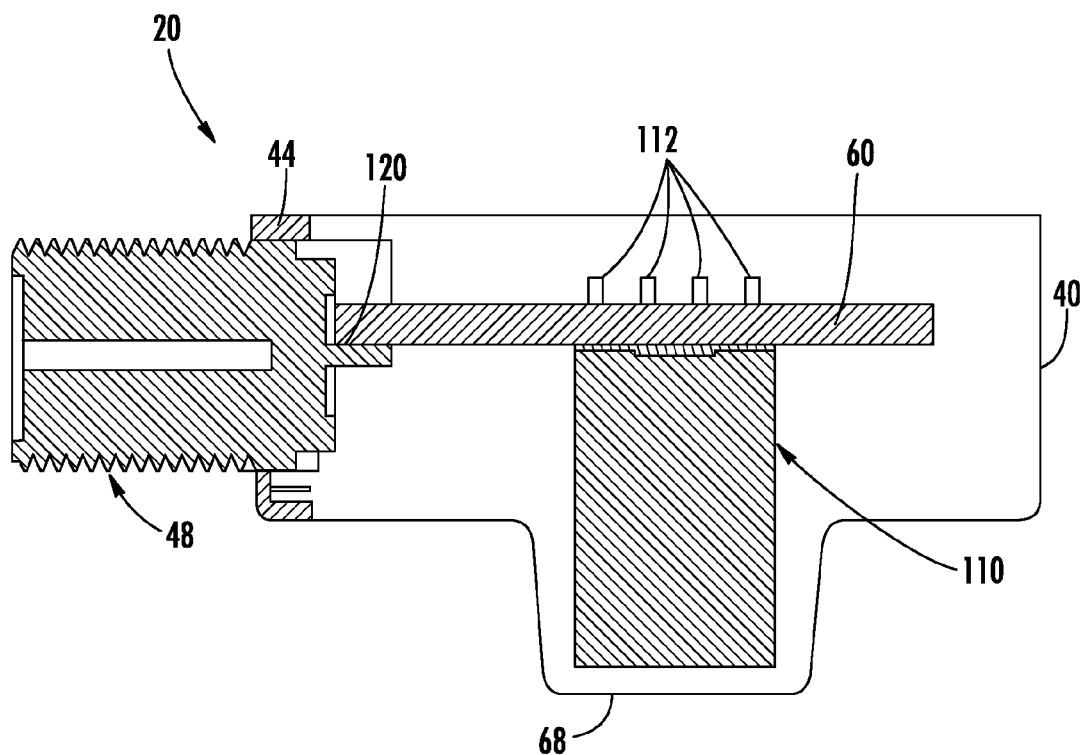
FIG. 4 is a longitudinal section view of the coax-balun module taken on line 4-4 in FIG. 3.

FIG. 4 is a longitudinal section view of coax-balun 20. Signal conversion takes place at a balun 110 that extends downwardly into well 68 and is shown as plugged in to PCB 60 via pins 112, 114. Balun 110 may be a transformer used to convert signals of differing electrical properties. Balun 110 can be an impedance matching device comprised of a transformer and DC blocking components. In exemplary embodiments, the front edge of PCB 60 may engage with a projecting mating surface 120 of threaded plug 48. Ring conductor 62 may be connected to one of pins 112, and tip conductor 64 may be connected to one of pins 114. The input from conductors 62, 64 may be thereby connected for conversion in balun 110.

Figure 5:
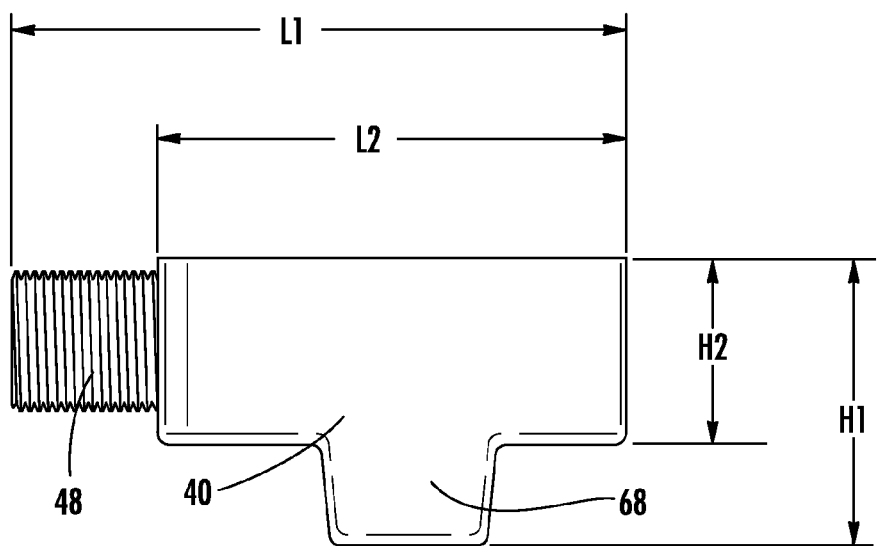
FIG. 5 is a side elevational view of the coax-balun module illustrated in FIG. 1.
Figure 6:
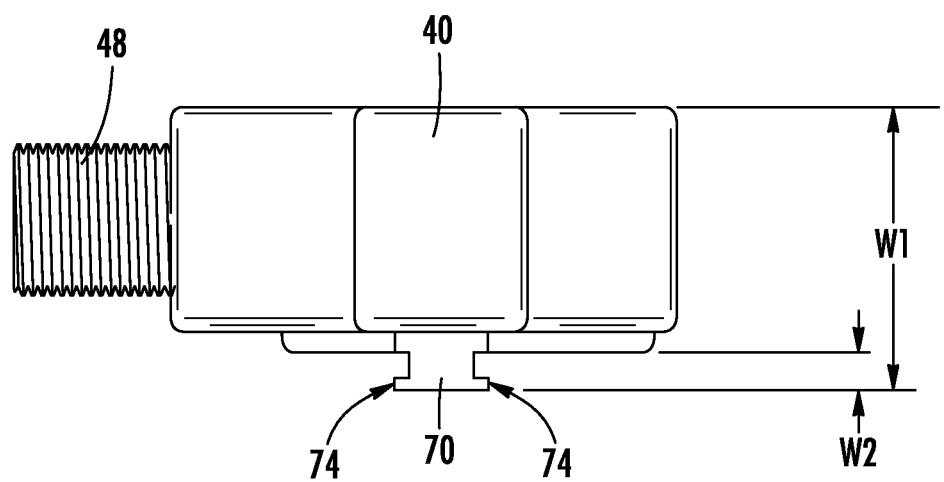
FIG. 6 is a top view of the coax-balun module.

FIGS. 5 and 6 illustrate various dimensions of the coax-balun module 20. Referring to FIG. 5, module 20 has an overall length L1 including threaded plug 48, a length L2 of housing 40, an overall height H1 including balun well 68, and a height H2 excluding balun well 68. Referring to FIG. 6, module 20 has an overall width W1 including mounting projection 70, and a width W2 of housing 40 and excluding mounting projection 70.

In exemplary embodiments, module 20 may be relatively small and may occupy a single position on existing NIDs. The length L1 can be less than 2.5 or even less than 2.2 inches, and the length L2 can be less than 1.7 inches. The height H1 can be less than 1.2 inch or even less than 1.0 inch, and the height H2 can be less than 0.8 inch. The width W1 may be less than 1.1 inch or even less than 0.9 inch and the width W2 may be less than 0.2 inch. In an exemplary embodiment, the length L1 is 2.0 inches, the length L2 is 1.5 inches, the height H1 is 0.8 inch, the height H2 is 0.5 inch, the width W1 is 0.7 inch, and the width W2 is 0.1 inch.

According to another embodiment, the length L1 is less than 2.1 inches, the length L2 is less than 1.6 inches, the height H1 is less than 0.9 inch, the height H2 is less than 0.6 inch, and the width W1 is less than 0.8 inch.

In exemplary embodiments, module 20 may be used on the Universal xDSL Line Module POTS Splitter, available from Corning Cable Systems, hickory N.C. On the CAC 9600/7600 NID, the Ni-2000 style, and Universal 3/6 Line NIDS, all also available from Corning Cable Systems, module 20 may clip to the rear of the xDSL Line Module. Conductors 62, 64 may be connected to the data port IDC of the line module, and the conductor 66 may be connected to the ground bar on the NID.

According to the present embodiment, coax-balun module 20 may be a small add-on module that occupies a single position in existing NIDS. The module 20 may be small enough to fit on existing Universal Line Module, or used as a standalone module or with other line modules. coax-balun module 20 may snap on to an existing ULM DSL splitter base and may be oriented in different ways to enable use in various NIDs. The module may also be used in various POTS splitters by attaching to the data port. Coax-balun module 20 is simple and relatively easy to manufacture.

It will be apparent to those skilled in the art that various modifications and variations can be made to the present disclosure without departing from the spirit and scope of the disclosure. Thus, it is intended that the present disclosure cover the modifications and variations of this disclosure, provided they come within the scope of the appended claims and their equivalents.

We claim:

1. A coax-balun module, comprising:
   a housing;
   a threaded plug mounted in an end of the housing;
   at least two input conductors;
   at least one ground conductor;
   a printed circuit board located within the housing, the printed circuit board being electrically connected to the at least two input conductors and the at least one ground conductor; and
   a balun transformer disposed within a balun well in the housing and adjoining the printed circuit board such that the balun transformer is plugged into the printed circuit board, and wherein a front edge of the printed circuit board engages with a mating surface of the threaded plug, wherein the module has an overall length of less than 2.5 inches, an overall height of less than 1.2 inches, and an overall width of less than 1.1 inches, whereby the module is compact enough to occupy only a single position on a network interface device (NID).

2. The coax-balun module of claim 1, the threaded plug defining a coaxial connector.

3. The coax-balun module of claim 2, the coax-balun module being adapted to convert between input signals from the input conductors and the coaxial connector.

4. The coax-balun module of claim 1, the printed circuit board being in electrical communication with both the threaded connector and the balun transformer.

5. The coax-balun module of claim 4, the housing having at least one open top for installing the balun transformer, the open top being adapted to receive a potting material.

6. The coax-balun module of claim 5, the module including a potting compound for sealing and insulating the conductors and printed circuit board.

7. The coax-balun module of claim 1, the module having a length of less than 2.2 inches.

8. The coax-balun module of claim 7, the module having a height of less than 1.0 inch.

9. The coax-balun module of claim 8, the module having a width of less than 1.0 inch.

10. The coax-balun module of claim 1, the housing including at least one mounting projection on at least one side of the housing.

11. The coax-balun module of claim 10, the mounting projection including at least two outwardly extending flanges.

12. The coax-balun module of claim 1, the module having a length of less than 2.2 inches, a height of less than 0.9 inch, and a width of less than 0.8 inch.

13. The coax-balun module of claim 1, the housing comprising a polymeric material.

14. A coax-balun module engaged with a splitter base, comprising:
    a coax-balun module, comprising:
      a housing having a mounting projection;
      a threaded plug mounted in an end of the housing;
      a printed circuit board located within the housing; and
      a balun transformer disposed within the housing; and
    a splitter base, the mounting projection engaging the splitter base, wherein coax-balun module may be mounted to the splitter base via the mounting projection in two orientations by rotating the module by 180 degrees, wherein the splitter base comprises a mounting groove having flanges, wherein the mounting projection has flanges that mate with the flanges of the splitter base, wherein the splitter base further comprises a pivoting arm with a snap projection that engages the mounting projection to secure the coax-balun module to the splitter base, and wherein the pivoting arm may pivot rearwardly to disengage from the mounting projection to allow the coax-balun module to be removed from the splitter base.

15. The coax-balun module of claim 14, the threaded plug defining a coaxial connector.

16. The coax-balun module of claim 15, the coax-balun module being adapted to convert between input signals from the input conductors and the coaxial connector.

17. The coax-balun module of claim 14, the module having a length of less than 2.2 inches, a height of less than 0.9 inch, and a width of less than 0.8 inch.

18. The coax-balun module of claim 14, the housing comprising a polymeric material.

* * * * *